(12) United States Patent
Fang et al.

(10) Patent No.: US 8,977,037 B1
(45) Date of Patent: Mar. 10, 2015

(54) METHODS AND SYSTEMS OF CREATING A STEREOSCOPIC IMAGE

(75) Inventors: Hui Fang, Changshu (CN); Ming Yin, Chengdu (CN)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/600,809

(22) Filed: Aug. 31, 2012

(51) Int. Cl.
*G02B 27/22* (2006.01)
*G03B 35/00* (2006.01)

(52) U.S. Cl.
USPC ............... 382/154; 348/E13.003; 359/466; 352/57

(58) Field of Classification Search
CPC ..... H04N 13/026; H04N 13/04; H04N 13/00; H04N 5/23254; H04N 13/0022; H04N 13/025; H04N 5/23267; H04N 13/0203; H04N 13/0055; H04N 13/0018; G06T 7/0075; G06T 2207/10021; G06T 7/20; G06T 15/00; G06T 15/20; G06T 2207/10012; G06K 9/20; G06K 9/32
USPC ............ 382/154, 103, 107, 232; 348/412, 51, 348/54, 47, 56, E13.001, E13.002, 348/E13.026, E13.059, E13.036, E13.04, 348/E13.06, E13.071, E13.022, E13.042, 348/E13.062, E13.003; 359/462, 466, 464; 345/418, 419; 352/57, 58; 600/111
See application file for complete search history.

(56) References Cited

U.S. PATENT DOCUMENTS

| | | | |
|---|---|---|---|
| 6,191,808 B1 * | 2/2001 | Katayama et al. | 348/39 |
| 6,388,666 B1 * | 5/2002 | Murray | 345/473 |
| 6,496,598 B1 * | 12/2002 | Harman | 382/154 |
| 8,274,552 B2 * | 9/2012 | Dahi et al. | 348/47 |
| 8,441,520 B2 * | 5/2013 | Dahi et al. | 348/47 |
| 8,565,517 B2 * | 10/2013 | Ha | 382/154 |
| 8,599,199 B2 * | 12/2013 | Noh et al. | 345/419 |

* cited by examiner

Primary Examiner — Sheela Chawan

(57) ABSTRACT

Disclosed herein are methods and systems for creating stereoscopic images. A left-eye view image for a stereoscopic image and an imperfect right-eye view image may be received. A smooth optical flow may be generated from the received image representing the left-eye view to the imperfect image representing the right-eye view to produce a first candidate right-eye view. Objects are identified in the imperfect image, and merged into the first candidate right-eye view image to create a right-eye view image. A stereoscopic image is created from the left-eye view image and right-eye view image.

22 Claims, 5 Drawing Sheets

US 8,977,037 B1

METHODS AND SYSTEMS OF CREATING A STEREOSCOPIC IMAGE

BACKGROUND

1. Field

This field generally relates to computer graphics and stereoscopic images.

2. Background

Consumer devices with stereoscopic, or three-dimensional (3-D) viewing capability have been growing in popularity. However, the creation of such content is limited by currently available equipment. For example, using two photographs taken side-by-side may not lead to a smooth stereoscopic viewing experience.

BRIEF SUMMARY

In an embodiment, a method of creating a stereoscopic image is disclosed. An image representing a left-eye view for a target stereoscopic image is received. Further, an imperfect image representing a right-eye view for a target stereoscopic image is received. A smooth optical flow from the received image representing the left-eye view to the imperfect image representing the right-eye view is generated. From the smooth optical flow, a first candidate right-eye view is produced. Objects are identified in the imperfect image. The identified objects are merged into the first candidate right-eye image. Based on the merging, a right-eye view image is created. A target stereoscopic image is created from the left-eye view image and the right-eye view image.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
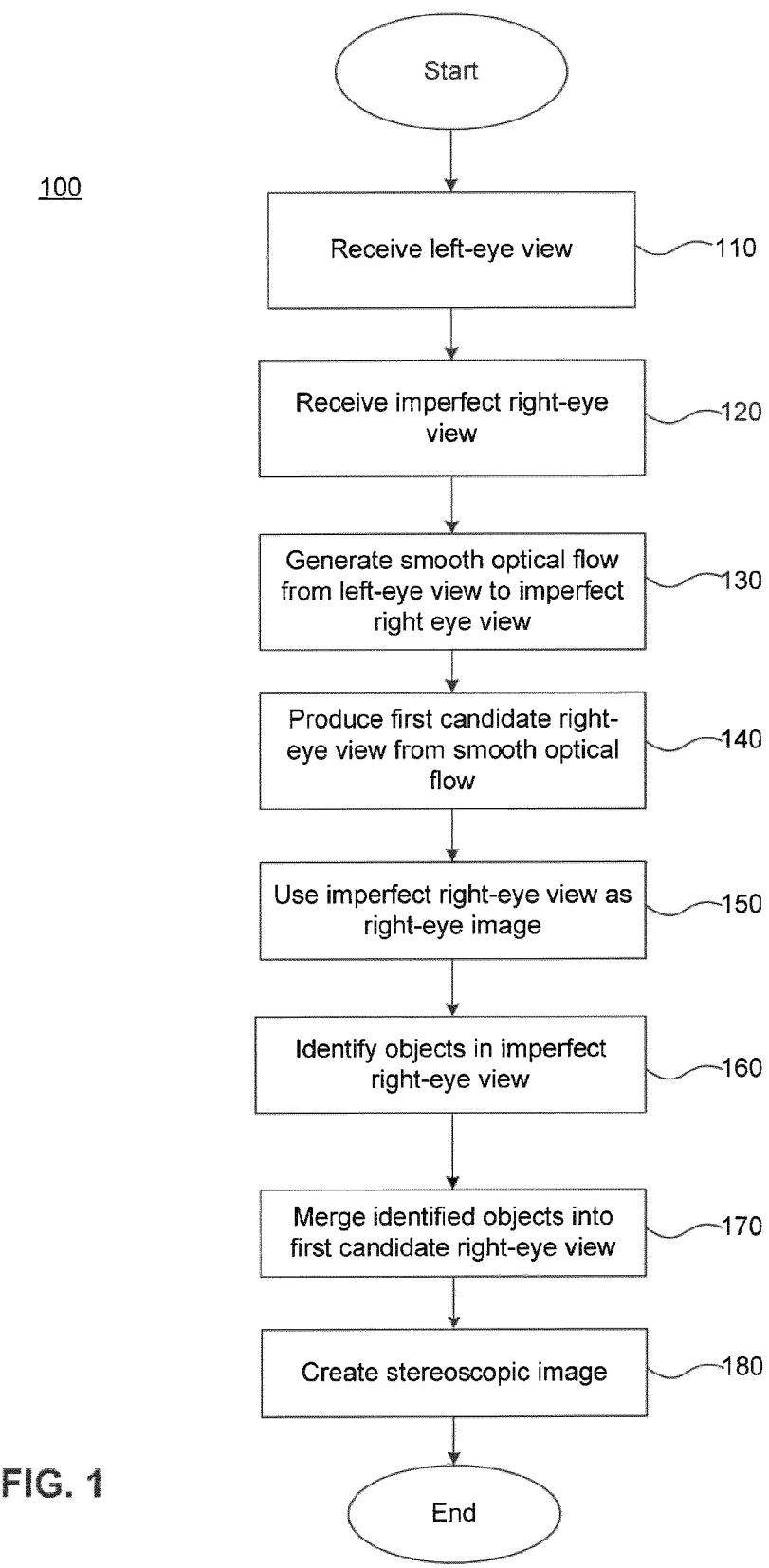
FIG. 1 is a diagram of a method for creating a stereoscopic image.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Stereoscopic, or 3-D, pictures and video have been growing in popularity recently. Devices supporting stereoscopic imagery have become widely available. Such devices include red-cyan glasses enabling stereoscopic images on common video equipment, to newer 3-D televisions which do not require glasses. Producing high-quality stereoscopic content typically requires special hardware. Typically, to create a stereoscopic image, an image for the left eye $A_{left}$ and an image for the right eye $A_{right}$ are required.

A first approach of creating stereoscopic images reconstructs a given scene using computer vision techniques. For example, using a given image, images can be reconstructed for one or both eyes using the disparity of features between two images. For example, given a left-eye image, the right-eye image can be reconstructed. Provided the reconstruction is successful, the resulting stereoscopic image will not contain artifacts. However, the detail of three-dimensional perception is limited by the reconstructed model. If a finely detailed structure is not well captured during reconstruction, or the image is not captured with enough detail, the resulting stereoscopic image may appear flat.

A second approach of creating stereoscopic images utilizes two images $A_{left}$ and $A_{right}$ of a scene taken from slightly different angles. Using devices such as stereoscopic glasses, each eye of the viewer receives the corresponding image from the respective angle to create the perception of a three-dimensional image. This approach provides a viewer precise depth perception at the pixel level, when using two well-controlled cameras. However, if the cameras and resulting images are not well-coordinated, the viewer's experience may be poor. For example, if the baseline between the two photos are too large, objects closer to the camera may shift a large amount relative to the background. Additionally, perspective change or a difference in camera height may cause some objects to drift in directions in two viewers. Further, when two photos are taken at a different time, moving objects may cause inconsistency in a resulting stereoscopic image. These factors may cause discomfort in the viewer.

Embodiments relate to a method of utilizing both reconstruction and two images of a scene to create a superior stereoscopic image. In an embodiment, an imperfect right-eye image can be used generate a stereoscopic image using 3-D reconstruction techniques. The right-eye image can also be used as a right-eye view for a second photo taken for a scene at a slightly different angle than a first photo, as described above.

FIG. 1 is a diagram of a method 100 for creating a stereoscopic image (stages 110-180). In one example not intended to be limiting, method 100 is implemented using a stereoscopic image creator as described further below with respect to FIG. 4.

Method 100 begins at stage 110, where a left-eye image, $A_{left}$, is received. The left—eye image $A_{left}$ can be received from a database, such as an image database, or can be received over a network.

At stage 120, an imperfect candidate for a right-eye image, image B, is received. Image B can be received from an image database or can be received over a network. Image B may have been taken near the right-eye angle, and may deviate from image $A_{left}$ in both the horizontal (x) and vertical (y) direction. Further, a small portion of the objects in the scene may have moved from one image to the other. For example, trees may have been swayed due to the wind between the time image $A_{left}$ and image B were taken.

At stage 130, a smooth optical flow $\vec{F}$ is generated from $A_{left}$ to B by interpolating vectors between matching pixels in two images. A smooth optical flow measures an amount of movement between two images. Matched pixel pairs can be produced using existing methods. For example, scale-invariant feature transform (SIFT) can be used. SIFT is a computer vision technique of detecting and describing local features in images. A local feature can be detected in both $A_{left}$ and B, and the movement of the local feature from $A_{left}$ to B can be determined for the smooth optical flow. Additionally, reconstructed 3-D points in the scene can be used to match pixel pairs. This technique can be utilized if more than one nearby candidate image exists. Matching the amount of movement of pixels from $A_{left}$ to B approximates the overall movement from image $A_{left}$ to image B, to generate the smooth optical flow.

A disparity field D can be generated as part of the generated smooth optical flow. Assuming there is a 3-D reconstruction of the scene which gives depth estimation for each pixel, using an existing two-view or multiple-view reconstruction, such a depth field can define a disparity field D.

In one embodiment, an estimation of the scene depth using two images without camera calibration is assisted by the smooth optical flow $\vec{F}$. An optical flow determines how corresponding pixels move from one image to another image. Decomposing $\vec{F}$ into horizontal (x) and vertical (y) components gives the following equation:

$$\vec{F} = F_x \cdot \hat{x} + F_y \cdot \hat{y},$$

In the above equation, $F_x$ and $F_y$ contain the optical flow vector's components in the x and y direction for each pixel, respectively. For example, $F_x$ precisely captures the disparity field D from $A_{left}$ to $A_{right}$, if B shares an identical camera pose with the imaginary camera for $A_{right}$. $F_x$ serves as an estimation of a disparity field D from $A_{left}$ to $A_{right}$ with an amount of perspective error. Disparity mapping operators can also be applied on $F_x$ for comfortable viewing using techniques based on stereoscopic warping, as described in M. Lang, A. Hornung, O. Wang, S. Poulakos, A. Smolic, and M. Gross, *Nonlinear Disparity Mapping for Stereoscopic 3-D*, ACM Trans. Graph. 29(3), 2010.

Thus, at stage 140, a first candidate right-eye image is produced by applying D on $A_{left}$ to produce $A_{right1}$. The resulting stereoscopic image may be smooth and comfortable to view, but may not provide any 3-D details beyond the resolution of D. The first candidate right-eye image $A_{right1}$ represents a right-eye image in accordance with the first approach described above. However, the first candidate image $A_{right1}$ does not use any information from image B.

Thus, at stage 150, the imperfect right-eye view image B is considered as the right eye image in accordance with the second approach described above, $A_{right2}$. That is, the imperfect right-eye view image is considered as a photo taken of the scene at a slightly different angle. Thus, image B is moved to the position where $A_{right2}$ would have been taken. For example, as described above, the imperfect right-eye view image may have been taken to create a stereoscopic image to be viewed with stereoscopic glasses. A stereoscopic image using the left-eye view and the imperfect right-eye image may lead to better details in depth perception, but also may include artifacts such as those described herein.

At stage 160, individual objects present in the imperfect right-eye view image B are identified. In one embodiment, individual objects are identified with the assistance of a clustering algorithm. For example and without limitation, K-Means clustering can be used to segment B into multiple parts by clustering the image on pixel color and optical flow characteristics, such that each segmented part is likely part of one individual object. For example, a window or a sign may be segmented as an object.

In one embodiment, identifying individual objects present in the imperfect right-eye view image B assists in reducing artifacts in creating the second candidate right-eye image $A_{right2}$. Once individual objects are identified, they can be merged into $A_{right1}$ to provide a better viewing experience.

To merge objects, identifying corresponding positions of each object is necessary in one embodiment. Thus, for a given object S, its representations in $A_{left}$ and B are named as $S_{A\_left}$ and $S_B$ respectively. Objects $S_{A\_left}$ and $S_B$ are related by $F(S_{A\_left})=S_B$, where F is defined as the smooth optical flow detailed above. A translation can be found that moves object $S_B$'s center to its proper position in image $A_{right}$ by the following equation:

$$\vec{T} = \sum_i D_i \cdot \hat{x} - \vec{F}_i,$$

for all pixels $P_1$ in $S_B$.

Thus, a copy of the object $S_B$ can be pasted in $A_{right2}$ by the following equation: $S_{A\_right2}=T(S_B)$. The object $S_{A\_right2}$ may not be a good choice to use in $A_{right2}$ for various reasons. Although the center position of the object may be correct, the object may exhibit certain artifacts. For example, matching feature points may differ in height between objects $S_{A\_left}$ and $S_{A\_right2}$, which may lead to difficulties in focusing when viewing the two images containing the objects. This type of artifact may be inevitable if the object in image $A_{left}$ and B appears in different sizes due to a distance change. Further, the object may show discontinuity in depth at its segment boundary against a background. The object may also have a large disparity beyond a comfortable view if it is too close to the camera or if it was moving. Finally, the object may have changed shape or appearance in two images, making it impossible to focus on. These artifacts may contribute to the reasons why a stereoscopic image that results from two images may appear uncomfortable to a viewer.

In order to address these artifacts, in one embodiment, objects are merged using Poisson image editing on the disparity field. Therefore, at stage 170, various objects $S_{A\_right2}$ are merged into $A_{right1}$ to increase detail.

As stated above, to merge the objects $S_{A\_right2}$ into $A_{right1}$, Poisson image editing on the disparity field is utilized in one embodiment. A final image $A_{right}$ is created by merging multiple $S_{A\_right2}$ onto $A_{right1}$ whenever applicable, and using features of $A_{right1}$ as the background to fill the holes and provide consistent depth constraints.

In order to merge features of one image into the other, both $S_{A\_right1}$ and $S_{A\_right2}$ can be used. $S_{A\_right1}$ may be known as S's image advected from $A_{left}$ to $A_{right}$ using the disparity field D. $S_{A\_right1}$ may not have the artifact of different feature point heights. This may be because D, as described above, is derived from the reconstruction process and is only in horizontal (x) direction and not in the vertical (y) direction. Further, $S_{A\_right2}$ may contain better depth details of a particular object, while $S_{A\_right1}$ may align better with $A_{left}$. Thus, in one embodiment, $S_{A\_right2}$ is deformed, such that the object keeps its internal details while aligning with object $S_{A\_right1}$ on certain constraint points. This technique can combine the advantages of both objects, leading to a superior stereoscopic image.

The inventors recognized that this technique is akin to Poisson image editing used with pixel colors. Poisson image editing techniques have been used in different contexts when attempting to paste objects from one two-dimensional image onto another two-dimensional image. Poisson image editing deforms a portion of the pasted object and the two-dimensional image to create a smooth transition between the object and its background. The deformation modifies color channels of the images to create a smooth effect. In embodiments disclosed herein, Poisson image editing operates on the disparity field instead of pixel colors.

Thus, $S_{A\_right1}$ and $S_{A\_right2}$ are related by $Ts(S_{A\_right2})=S_{A\_right1}$, under a coarsely reconstructed geometry. In such a situation, $DF^{-1}(S_B)=S_{A\_right1}$, where $F^{-1}$ represents a short-hand for advection using reversed vectors in F.

Accordingly, $S_B=T^{-1}(S_{A\_right2})$. Solving the above equations results in $Ts=DF^{-1}T^{-1}$.

A deformation field $\vec{T}_P$ from $S_{A\_right1}$ can be found by solving Laplacian equations on the x and y components of $\vec{T}_P$:

$$\begin{cases} \Delta T_{Px} = 0 \\ \Delta T_{Py} = 0 \end{cases}$$

while $\vec{T}_P=\vec{T}_s$ at constraint points denoted by $\{C_1\}$. The deformation field $\vec{T}_P$ smoothly deforms $S_{A\_right2}$ such that pixels at $\{C_1\}$ share the same disparity with $S_{A\_right1}$. This corrects the artifact of feature points occurring at different heights, as described above. Further, the artifact of discontinuity in object depth at the segment boundary against a background may be corrected. Points$\{C_1\}$ are selected by matching salient feature points using image features, similar to SIFT.

In order to reduce further artifacts, in one embodiment, $S_{A\_right2}$ is not used in its entirety. A mask can be determined to exclude pixels where $S_{A\_right2}$ does not have a counter-part in $S_{A\_right1}$ that matches features within reasonable disparity. Such a mask can be determined in part by determining the distance between corresponding pixels in $S_{A\_right2}$ and $S_{A\_right1}$. If the distance is below a particular threshold, then that pixel is included, while if the distance is above a particular threshold, the pixel is excluded. For example, pixel colors within a feature, such as a window, can be matched between an $S_{A\_right2}$ and $S_{A\_right1}$, and the L2 distance can be calculated to determine whether to use a portion of $S_{A\_right2}$. The L2 distance, or Euclidean distance, is the distance measured by the length of a line segment between a point in $S_{A\_right2}$ and $S_{A\_right1}$. Thus, this approach corrects the artifact that occurs when an object has a large disparity beyond a comfortable view due to the object being too close to the camera or moving. Further, artifacts that occur when objects change shape in two images causing focusing issues are corrected.

Once objects $S_{A\_right2}$ are merged into $A_{right1}$, a final image $A_{right}$ is created. At stage 180 of method 100, the final image $A_{right}$ is combined with the left-eye view $A_{left}$ to create a stereoscopic image to be viewed.

The object may also have a large disparity beyond a comfortable view if it is too close to the camera or if it was moving. Finally, the object may have changed shape or appearance in two images, making it impossible to focus on.

Method 100 of FIG. 1 is described as receiving a left-eye image at stage 110 and an imperfect right-eye image at stage 120. In some embodiments, a right-eye image is received at stage 110, and an imperfect left-eye image is received at stage 120. Accordingly, the stages 130-180 can be modified to apply equally to the right-eye image received at stage 110 and the left-eye image received at stage 120.

Figure 2:
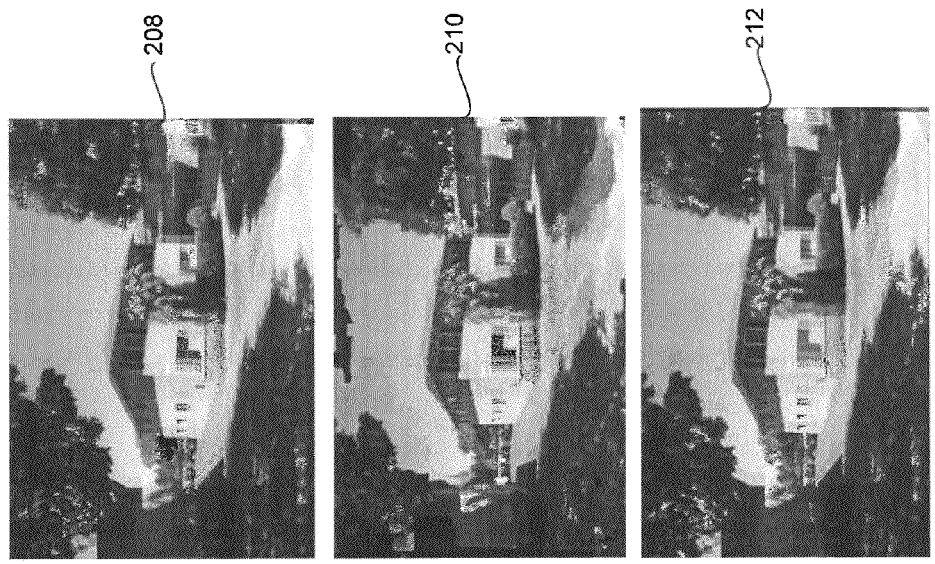
FIG. 2 is a set of images representing various images used in and generated by embodiments.
Figure 2:
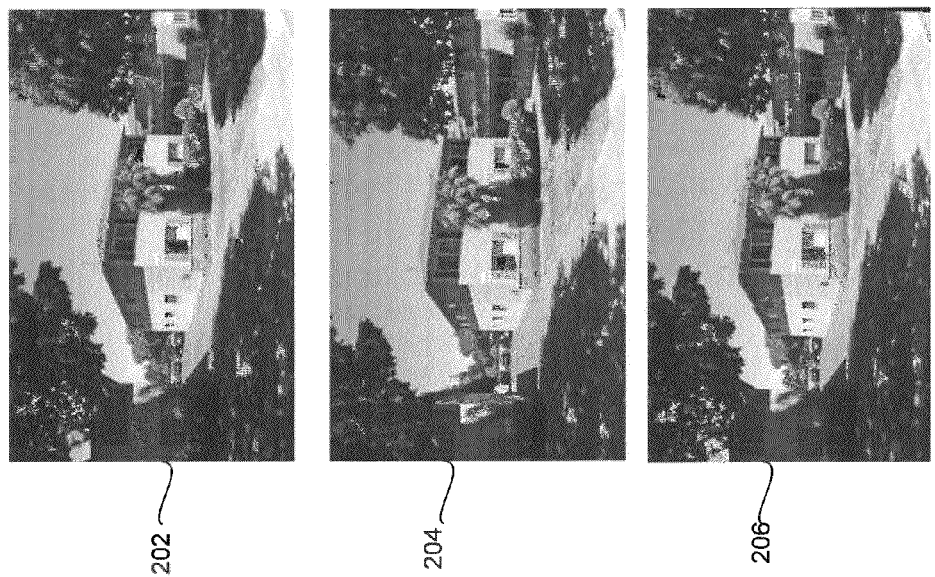

FIG. 2 is a set of images that represent various images that can be used in or generated by various steps of method 100.

Image 202 is a left-eye view $A_{left}$ that is received at stage 110. Image 204 is a first imperfect right-eye view received at stage 120, in accordance with an embodiment.

Image 208 represents a stereoscopic image created using computer vision techniques. As seen in image 208, certain three dimensional details, such as that of the tree in the front of the building in the picture, may be flattened out. That is, the details of the tree may not appear as if they are three dimensional, and instead may still appear as two dimensional. As described with reference to stage 140, the right-eye image used for image 208 is produced from a smooth optical flow generated from the left-eye view of image 202 to the first imperfect right-eye view of image 204.

Image 210 represents a stereoscopic image created using two images, image 202 and image 204, in accordance with stage 150. As seen in image 210, certain artifacts are present, because of changes in position between image 202 and image 204. Most notably, the trees in the top left corner of the image are mismatched due to the different positioning of images 202 and 204.

Image 206 then is a composite right-eye view created in accordance with method 100. Objects identified in image 204 in accordance with stage 160 are merged with the right-eye image used for image 208, in accordance with stage 170. The final stereoscopic image created in accordance with stage 180, using images 202 and 206, is illustrated in image 212.

Figure 3:
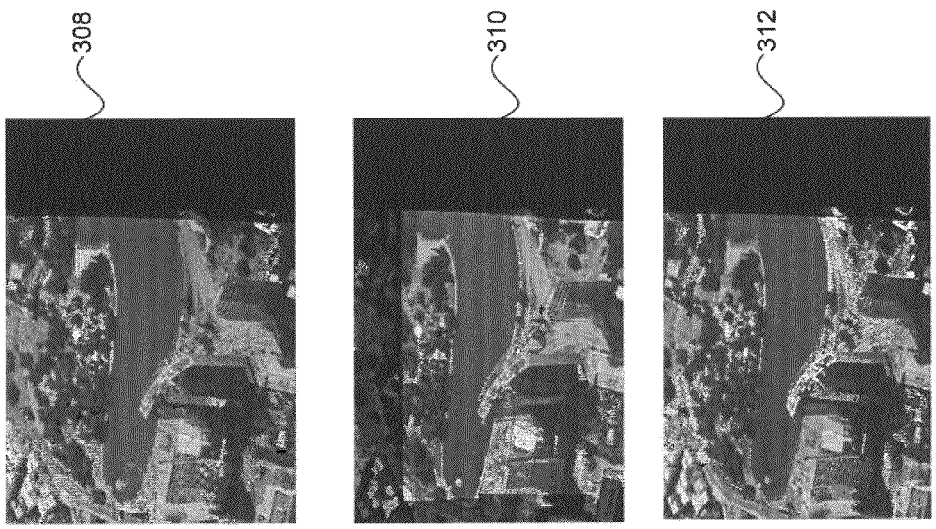
FIG. 3 is a set of images representing various images used in and generated by embodiments.
Figure 3:
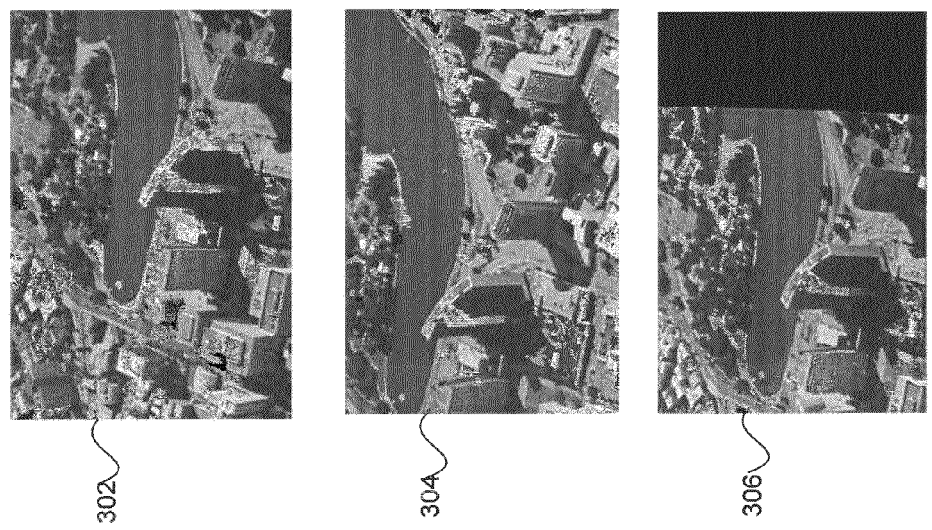

FIG. 3 is a set of images representing various images used in or generated by various steps of method 100.

Image 302 is a left-eye view $A_{left}$ taken by a camera that is received in accordance with stage 110. Similarly, image 304 is an imperfect right-eye view taken by a camera and received in accordance with stage 120.

Image 308 represents a stereoscopic image created using computer vision techniques. As seen in image 308, certain three dimensional details may be flattened out. As described with reference to stage 140, the right-eye image used for image 308 is produced from a smooth optical flow generated from the left-eye view of image 302 to the first imperfect right-eye view of image 304.

Image 310 represents a stereoscopic image created using two images, image 302 and image 304, in accordance with stage 150. As seen in image 310, certain artifacts are present, most notably in the building in the center, due to the different positioning of images 302 and 304.

Image 306 then is a composite right-eye view created in accordance with method 100. Objects identified in image 304 in accordance with stage 160 are merged with the right-eye image used for image 308, in accordance with stage 170. The final stereoscopic image created in accordance with stage 180, using images 302 and 306, is illustrated in image 312.

Figure 4:
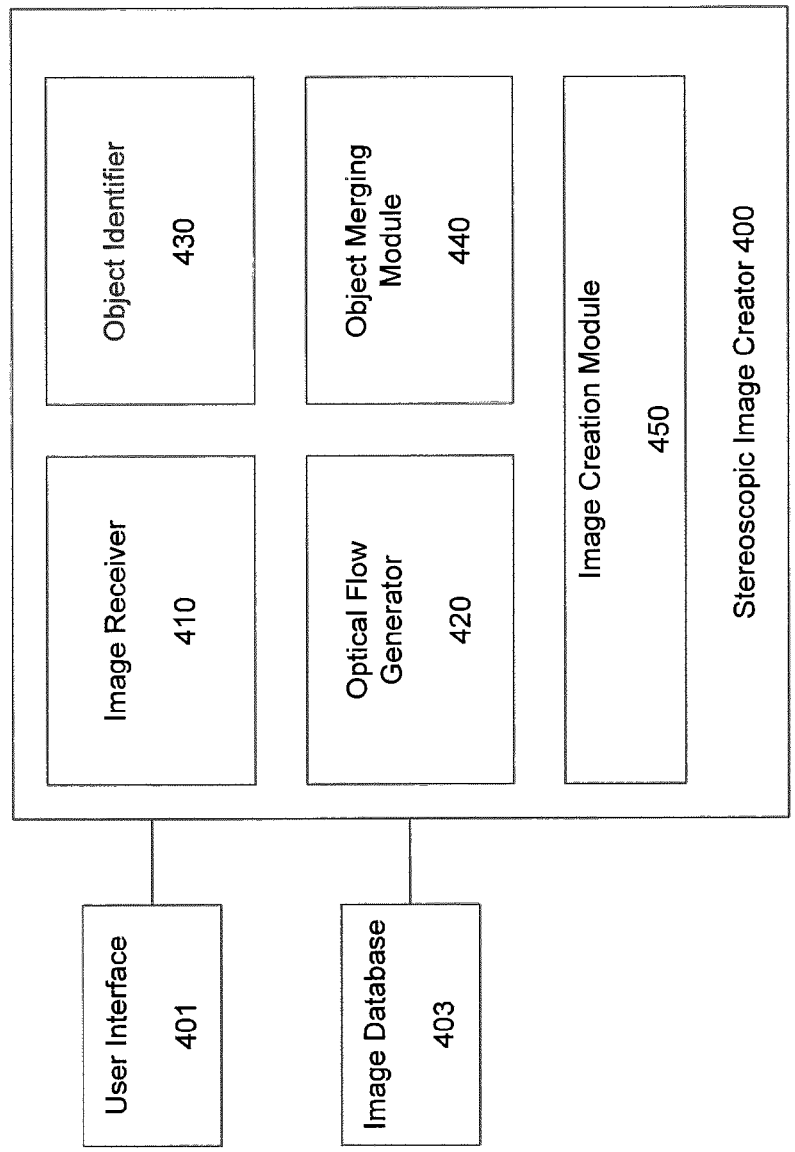
FIG. 4 is a diagram of a system in accordance with embodiments.

FIG. 4 is a diagram of a stereoscopic image creator 400 that can be used to implement embodiments disclosed herein. Stereoscopic image creator 400 is coupled to a user-interface 401 and image database 403. Stereoscopic image creator 400 includes an image receiver 410, optical flow generator 420, object identifier 430, object merging module 440, and image creation module 450. Stereoscopic image creator 400 (and its constituent modules 410-450) may be implemented in hardware, software, firmware, or a combination thereof.

Stereoscopic image creator 400 includes image receiver 410. Image receiver 410 may be configured to receive a left-eye image and one or more imperfect right-eye images in accordance with method 100 of FIG. 1.

Stereoscopic image creator 400 also includes optical flow generator 420. Optical flow generator 420 may generate an optical flow from a received left-eye image to an imperfect right-eye image, in accordance with step 130 of method 100.

Stereoscopic image creator 400 also may include image creation module 450.

Image creation module may produce a first candidate right-eye view from the smooth optical flow generated by smooth optical flow generator 420 in accordance with step 140 of method 100.

Stereoscopic image creator 400 may also include object identifier 430. Object identifier 430 may identify objects with the assistance of a clustering algorithm, such as K-Means, in accordance with step 160 of method 100.

Stereoscopic image creator 400 may also include object merging module 440. Object merging module 440 may merge objects from one imperfect right-eye view to another in order to reduce artifacts and increase detail, as described above. Object merging module may operate in accordance with step 170 of method 100.

Image creation module 450 may generate the target stereoscopic image from the image representing the left-eye view and the right-eye view image, in accordance with stage 180 of method 100.

Stereoscopic image creator 400 may be connected or coupled to user interface 401. User interface 401 may allow a user to control the operation of stereoscopic image creator 400, such as selecting which images to be used as a left-eye view or right-eye view. User interface 401 may also allow a user to view the results output by elements of stereoscopic image creator 400, such as image creation module 450.

Stereoscopic image creator 400 may also be coupled to or connected to image database 403. Image database may store left-eye views and imperfect right-eye views, and also may be used to store generated stereoscopic images. Image database 403 may be implemented in any type of persistent memory, and may be a relational or non-relational database.

Figure 5:
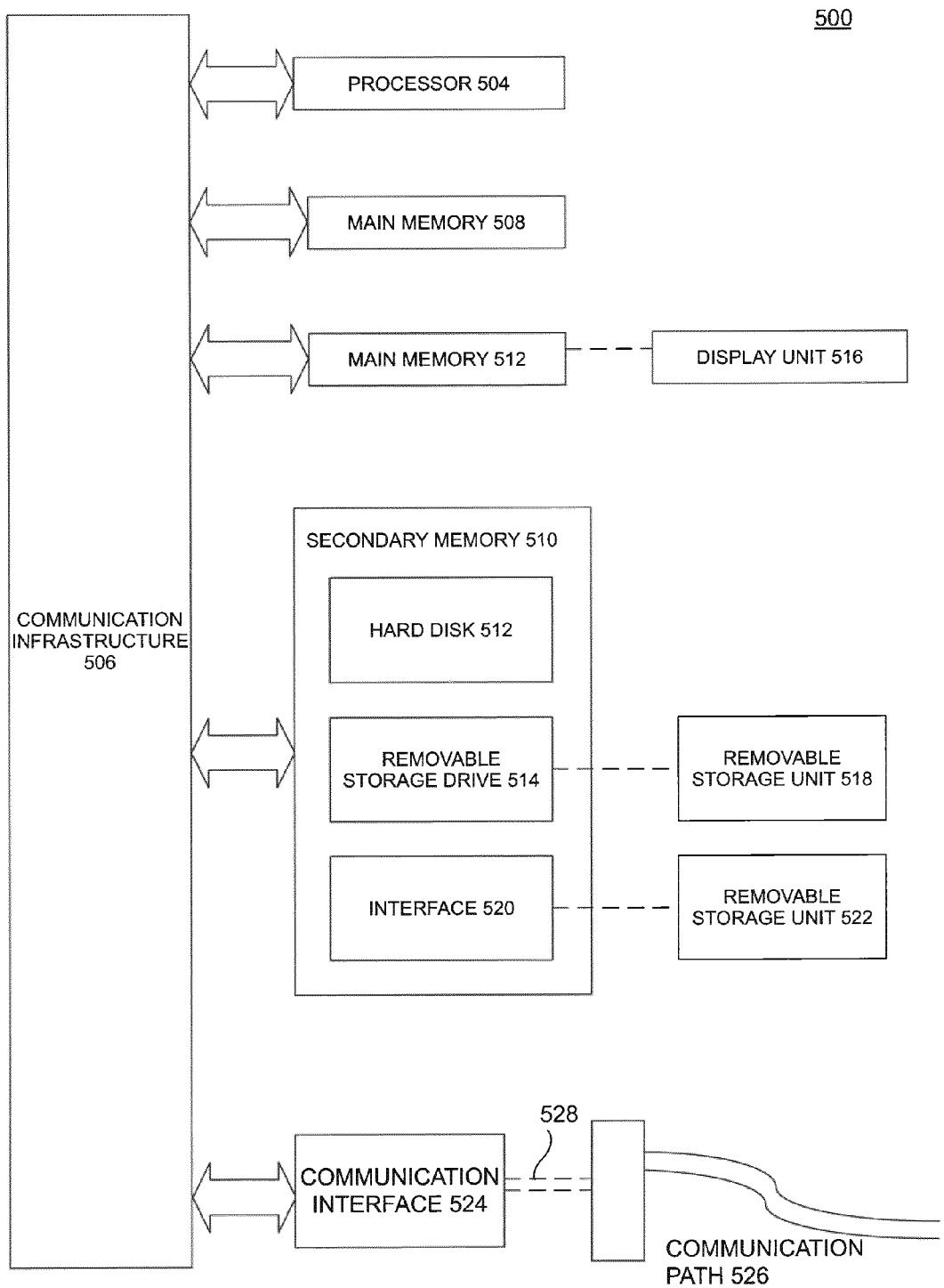
FIG. 5 is a diagram of a computer system that can be used to implement embodiments.

FIG. 5 illustrates an example computer system 500 in which embodiments of the present invention, or portions thereof, may be implemented as computer-readable code. For example, stereoscopic image creator 400 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1 and 4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc., which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to tangible media such as removable storage unit 518, removable storage unit 522, and a hard disk installed in hard disk drive 512 and does not include signals. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 100 of FIG. 1 discussed above. Accordingly, such computer programs represent controllers of the computer system 500. Where an embodiment is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method, comprising:
    generating, with at least one processing device, a smooth optical flow from a first image to a second image, wherein the first image represents one of a left-eye view and a right-eye view, and the second image represents the other one of a left-eye view and a right-eye view, and wherein the second image is an imperfect image that has at least one of a feature point having distorted height, a discontinuity in depth, an object with distorted shape, or an object with distorted appearance;
    producing a first candidate view from the smooth optical flow;
    identifying objects in the second image;
    merging the identified objects of the second image into the first candidate view;
    creating a third image based on the merging; and
    creating a target stereoscopic image from the first image and the third image.

2. The method of claim 1, wherein the first image represents a left-eye view of a target stereoscopic image, and wherein the second image is an imperfect image representing a right-eye view of the target stereoscopic image.

3. The method of claim 1, wherein the first image represents a right-eye view of a target stereoscopic image, and wherein the second image is an imperfect image representing a left-eye view of the target stereoscopic image.

4. The method of claim 1, wherein the step of identifying objects in the second image is performed by a clustering algorithm.

5. The method of claim 4, wherein the clustering algorithm is K-Means.

6. The method of claim 1, wherein the step of merging the identified objects of the second image into the first image reduces artifacts and increases detail.

7. The method of claim 1, wherein the smooth optical flow is generated by interpolating vectors between matching pixels in the first image and the second image.

8. The method of claim 1, further comprising producing a first candidate view from the smooth optical flow using computer vision techniques.

9. The method of claim 1, further comprising merging the identified objects of the second image into the first candidate view using Poisson image editing.

10. A non-transitory computer readable storage medium containing control logic stored thereon that, when executed by one or more processing devices, causes the one or more processing devices to:
    generate a smooth optical flow from a first image to a second image, wherein the first image represents one of a left-eye view and a right-eye view, and the second image represents the other one of a left-eye view and a right-eye view, and wherein the second image is an imperfect image that has at least one of a feature point having distorted height, a discontinuity in depth, an object with distorted shape, or an object with distorted appearance;

produce a first candidate view from the smooth optical flow;

identify objects in the imperfect image;

merge the identified objects of the second image into the first candidate view;

create a third image based on the merging; and create a target stereoscopic image from the first image and the second image.

11. The computer readable storage medium of claim 10, wherein the first image represents a left-eye view of a target stereoscopic image, and wherein the second image is an imperfect image representing a right-eye view of the target stereoscopic image.

12. The computer readable storage medium of claim 10, wherein the first image represents a right-eye view of a target stereoscopic image, and wherein the second image is an imperfect image representing a left-eye view of the target stereoscopic image.

13. The computer readable storage medium of claim 10, wherein the control logic causes the one or more processing devices to identify objects in the second image by a clustering algorithm.

14. The computer readable storage medium of claim 13 wherein the clustering algorithm is K-Means.

15. The computer readable storage medium of claim 10, wherein the smooth optical flow is generated by interpolating vectors between matching pixels in the first image and the second image.

16. The computer readable storage medium of claim 10, wherein the control logic causes the one or more processing devices to produce a first candidate view from the smooth optical flow by computer vision techniques.

17. The computer readable storage medium of claim 10, wherein the control logic causes the one or more processing devices to merge the identified objects of the second image into the first candidate view using Poisson image editing.

18. A system, comprising:
a receiver that receives a first and second image, wherein the first image represents one of a left-eye view and a right-eye view, and the second image represents the other one of a left-eye view and a right-eve view, and wherein the second image is an imperfect image that has at least one of a feature point having distorted height, a discontinuity in depth, an object with distorted shape, or an object with distorted appearance;
a smooth optical flow generator that generates a smooth optical flow from the first image to the second image;
a candidate image producer that produces a first candidate view from the smooth optical flow;
an object identifier that identifies objects in the second image;
an image creator that creates a third image by merging objects identified by the object identifier into the first candidate view; and
a stereoscopic image creator, implemented on at least on processing device, that creates a stereoscopic image from the first image and the third image.

19. The system of claim 18, wherein the first image represents a left-eye view of a target stereoscopic image, and wherein the second image is an imperfect image representing a right-eye view of the target stereoscopic image.

20. The system of claim 18, wherein the first image represents a right-eye view of a target stereoscopic image, and wherein the second image is an imperfect image representing a left-eye view of the target stereoscopic image.

21. The system of claim 18, wherein the object identifier further identifies objects in the second image using K-Means clustering.

22. The system of claim 18, wherein the image creator merges objects identified by the object identifier into the first candidate view using Poisson image editing.

* * * * *